United States Patent [19]

Nix et al.

[11] Patent Number: 5,394,085
[45] Date of Patent: Feb. 28, 1995

[54] ROLLING PROBE FOR THE CONTINUOUS MEASURING OF THE THICKNESS OF LAYERS OR STRIPS

[75] Inventors: Hans F. Nix, Cologne; Wolfgang Hausmann, Hennef, both of Germany

[73] Assignee: Elektro-Physik Hans Nix & Dr.-Ing. E. Steingroever GmbH & Co. Kommanditgesellschaft, Cologne, Germany

[21] Appl. No.: 933,687

[22] Filed: Aug. 24, 1992

[30] Foreign Application Priority Data

Aug. 30, 1991 [DE] Germany ............... 4128882

[51] Int. Cl.⁶ .............................. G01B 7/10
[52] U.S. Cl. ............................... 324/231
[58] Field of Search ............... 324/229–231, 324/171, 173, 174, 175, 207.22, 207.15–207.19

[56] References Cited

U.S. PATENT DOCUMENTS

| 2,155,267 | 4/1939 | Hathaway. | |
| 3,462,680 | 8/1969 | Kahoun et al. | 324/231 |
| 3,525,929 | 8/1970 | Mounce | 324/231 |
| 3,866,115 | 2/1975 | Lewis | 324/231 |
| 4,767,987 | 8/1988 | Montgomery | 324/231 |
| 5,214,376 | 5/1993 | Sikora | 324/230 |

FOREIGN PATENT DOCUMENTS

| 846920 | 7/1949 | Germany. |
| 1046896 | 12/1958 | Germany. |
| 3401466 | 7/1985 | Germany. |

Primary Examiner—Gerard R. Strecker
Assistant Examiner—Warren S. Edmonds
Attorney, Agent, or Firm—Fisher, Christen & Sabol

[57] ABSTRACT

In the rolling probe, the measuring pole is designed as a rotating, rotationally symmetrical roller (4), such as a disk, cylinder or sphere, which directly contacts the surface of object to be measured (5) and is placed in the range of a sensor system. As a result, the maximum possible signal deviation can be fully used for the measuring. An increased measured value resolution and measuring accuracy especially in the measuring of thin sheets is achieved. Further, the actual thickness measuring takes place at the contact point with the layer to be measured. Thus, a true "one-point measuring" is involved.

14 Claims, 5 Drawing Sheets

ROLLING PROBE FOR THE CONTINUOUS MEASURING OF THE THICKNESS OF LAYERS OR STRIPS

BACKGROUND OF THE INVENTION

1. Field of the Invention

The invention relates to a rolling probe for the continuous measuring of the thickness of layers or strips.

2. Background Art

Rolling probes for the continuous measuring of the thickness of layers or strips of electrically conducting or insulating, magnetic or nonmagnetic material, or of layers of such strips whose material properties differ from those of the carrier strip, with a measuring pole, to which a stationary sensor system is allocated, are known.

In such a known measuring probe (West German Patent No. 3,401,466), the measuring pole is placed inside of a hollow cylinder arched spherically in the area of the measuring pole and directed perpendicular to the strip or to the layer to be measured, and the cylinder, rolling off, contacts the strip or the layer only at one point of support and consists of a nonmagnetic material that does not significantly influence the measuring.

In this measuring probe, a magnetic air gap for design reasons is between the active measuring pole and the contact surface of the layer to be measured, an air gap whose size depends on heat expansions because of temperature influences and by which changes of measured values also are possible in a tilting of the measuring pole in traversing operation. Also, material inhomogeneities in the measuring roller can cause incorrect measured values, and the error increases with the magnetic air gap growing larger between an active sensor or measuring pole and the surface to be measured.

Also, a maximum use of the measuring signal is not possible since it is reduced by the size of the magnetic air gap. Further, incorrect measured values can be caused by eddy-current effects in the high-grade steel material of the roller and, further, the maximum requirements of the concentricity tolerance of about 0.002 mm of the roller can be met only with difficulty relative to the fixed axis of rotation of the roller. Also, an easy deformability of the roller is produced by the small wall thickness in the area of the contact of the hollow roller with the surface of the object to be measured. Such rollers also require a high production expense.

Difficulties relative to the measuring accuracy of rolling probes also occur when the measuring pole is placed between two ball races contacting the layer to be measured. In such a measuring probe, the magnetic air gap between the measuring pole and the object to be measured can be kept comparatively small to better use the available measuring signal. But the measuring does not take place at the point of contact, since the two ball races are placed as pure idlers laterally or in tandem on both sides of the intervening measuring pole.

Also, in such a rolling probe, the measuring point and the contact point are not identical, by which a measured value is detected which does not have to correspond to reality.

Such a two-point sensor also has to be mounted on gimbals to assure that both idlers always satisfactorily contact the layer to be measured. But a traversing operation is not possible with a suspension on gimbals. The sensor or measuring pole tilts, and incorrect measurements result. Also, sheets which are more narrow than the distance of the parallel idlers cannot be measured.

In measurements which are to be performed on the sheet edge, which is bulge-like for production reasons, incorrect measurements also result by different sheet thicknesses under both idlers.

Also known in the patent literature is a two-point-rolling probe, i.e., an electromagnetic instrument for measuring the thickness of nonmagnetic layers on ferromagnetic bases, for example, of paint layers on iron. It can also be applied on nonmagnetic strips, sheets, etc., for thickness measurement if they lie on an iron base or run over an iron base.

Electromagnetic thickness gages are known, whose measuring probe is an iron core with a winding applied on it. The winding flowing through by an alternating current changes its impedance when approaching a ferromagnetic surface, which causes the deflection of an electrical measuring instrument, which can be calibrated in units of thickness of a layer.

The two-point-rolling improves the sensitivity of such a thickness gage. It is characterized in that the measuring probe consists of an H-shaped ferromagnetic core, an exciter winding is placed on its cross bar, and a measuring winding each on its four sides, which are electrically connected in series. The winding direction of the individual measuring windings is selected, so that an electrical measuring voltage is produced in the windings facing the layer to be measured, which is opposite of the voltage of the two other measuring windings facing away from the layer to be measured. The resultant differential voltage is a measurement for the distance to be measured of the probe from the ferromagnetic layer or for the thickness of a nonmagnetic layer located between the two.

The sides of the H-shaped measuring probe according to the invention can also be connected securely with the cross bar, can have a rectangular or any other cross-section or be matched in a suitable way to the shape of the parts to be measured. In this connection it is also suitable for disk-like sides to be securely connected with the cross bar and be placed rotatably in a coil shape, which supports the exciter winding and the measuring windings.

BROAD DESCRIPTION OF THE INVENTION

The object of the invention is to provide a rolling probe with simple technical means, so that incorrect measured values because of an air gap between the measuring pole and the surface of the object to be measured are avoided. Other objects and advantages of the invention are set out herein or are obvious herefrom to one skilled in the art.

The objects and advantages of the invention are achieved by the devices of the invention.

The invention involves rolling probes for the continuous measuring of the thickness of layers or strips of electrically conducting or insulating, magnetic or nonmagnetic material, or of layers of such strips whose material properties differ from those of the carrier strip, with a measuring pole, to which a stationary sensor system is allocated. The measuring pole is designed as a rotating, rotationally symmetrical roller (4), which directly contacts the surface of object to be measured (5) with its bearing surface and is placed in the range of the sensor system.

Preferably roller (4) consists of a sturdy material. Preferably roller (4) is designed as a disk, cylinder or sphere. Preferably the bearing surface of roller (4) is spherical. Preferably the bearing surface of roller (4), especially in a design made of soft material, is hard-coated. Preferably rotating roller (4), if it is designed as a cylinder or disk, is used simultaneously also for distance measurement by magnetic or optoelectronic detection of markings on the roller, e.g., in the form of holes. Preferably a position sensor (17) is placed on rotating axis (10) of roller (4). Preferably in using a sphere as roller (4) by air-cushioning of roller (4) between concave bearing shells (13, 14) or between lateral ring bearings (15, 16), a defined distance to the coil form of measuring coil system (3) is present. Preferably a stationary measuring coil system (3) according to the magneto-inductive process with an excitation winding (7) flown through by alternating current with low excitation frequency and a measuring winding (8) is allocated to the measuring pole designed as roller (4), and a reference area each of suitable material on the opposite side of object (5) to be measured is allocated to the measuring pole. Preferably a stationary measuring coil system (3) according to the eddy-current process with an excitation winding (9) flown through by alternating current with high excitation frequency is allocated to the measuring pole designed as roller (4), and a reference area each of suitable material on the opposite side of object (5) to be measured is allocated to the measuring pole.

Preferably several permanent bar magnets (11), uniformly distributed on the periphery, radially directed outward from axis of rotation (10) of roller (4), are placed in or on roller (4), bar magnets which in the rotation of roller (4) alternately approach the reference plane on support (6) consisting of a ferromagnetic material. Preferably the changed magnetic field of permanent bar magnets (11) is detected in a permanently placed measuring winding (9a) by the rotation of permanent bar magnets (11) with roller (4) and also by the thickness of object to be measured (5) lying on support (6). Preferably the magnetic field of permanent bar magnets (11) changing by the rotation of permanent bar magnets (11) with roller (4) and also by the thickness of object to be measured (5) lying on support (6) is measured by at least one stationary magnetic field sensor (12) placed in direct proximity with the contact point of roller (4) on the surface of object to be measured (5). Preferably magnetic field sensor (12) is placed on a point next to permanent bar magnets (11) rotating with roller (4), in which in each passage of a permanent bar magnet (11), there is a noticeable change of the field strength and/or field direction of the stray field of the magnets. Preferably permanent bar magnets (11) are not uniformly distributed on the periphery of roller (4) so that the distance covered by the rolling probe results from the sequence of the measuring signals of the rotating roller.

The invention has the advantage that in using magnetically active rollers, which directly contact the surface of the object to be measured with their bearing surface, the maximum possible signal deviation on the measuring probe can be fully used for the measuring. As a result, an increased measured value resolution and measuring accuracy especially in the measuring of thin sheets is achieved. Further, the actual thickness measuring takes place in the rolling probe according to the invention as in a static layer thickness-measuring probe at the contact point with the layer to be measured. Thus, a true "one-point measuring" is involved.

In using magnetically active rollers, the out-of-roundness of the roller has practically no adverse effect on the measuring result. The measuring probe according to the invention allows the use of the magneto-inductive and also the eddy-current process. Since the rotationally symmetrical roller also can be made disk-shaped, measurements between raised longitudinal profiles of the running object to be measured are possible.

The narrow bearing surface of the disk-shaped roller also allows the thickness measuring on narrow strips, and in using magnetically active rollers, a tilting of the measuring probe relative to the object to be measured within certain limits is practically without harmful influence on the measuring accuracy.

In particular, in a design made of soft material, the spherical bearing surface of the roller can be hard-coated.

Further, the rotating roller, when it is designed as a cylinder or disk, can also be used simultaneously for distance measurement by magnetic or optoelectronic detection of markings on the roller, e.g., in the form of holes. But instead of this, a position sensor can be placed on the rotating axis of the roller.

In an advantageous embodiment of such a rolling probe, several permanent bar magnets, uniformly distributed on the periphery, radially directed outward from the axis of rotation of the roller, can be placed in or on the roller. These permanent magnets during the rotation of the roller alternately approach the reference plane on the support consisting of a ferromagnetic material, and the magnetic field of the permanent bar magnets is changed as a result and also by the thickness of the object to be measured lying on the support which is measured by a stationary magnetic field sensor placed in direct proximity with the contact point of the roller on the surface of the object to be measured.

But in a further advantageous embodiment of such a rolling probe modified as compared with the above, several permanent bar magnets can also be placed radially to the axis of rotation of the roller in or on the roller, and the changing magnetic field is detected in a stationary coil system.

In using a sphere as a roller, a defined distance to the coil form of the measuring coil system is present by air-cushioning of the roller between concave bearing shells or between lateral ring bearings.

The one-point-rolling probe of the invention is rather different in comparison to the two-point-rolling probe described above. The two-point-rolling probe is limited in its application to the measuring of the thicknesses of nonmagnetic layers on ferromagnetic bases. The two-point rolling probe measures the distance between the probe and the ferromagnetic base, thus indicates the thickness of the nonmagnetic layer located between probe and base. Irregular or curved surfaces will cause measurement accuracy problems and hinder use of the device. The invention probe does not suffer these problems.

Preferred embodiments of the invention are diagrammatically represented in the drawing.

BRIEF DESCRIPTION OF THE DRAWINGS

In the drawings:

FIG. 9 shows a side view of such a rolling probe in the direction of arrow IX of FIGS. 8 and 8a;

DETAILED DESCRIPTION OF THE INVENTION

Figure 1:
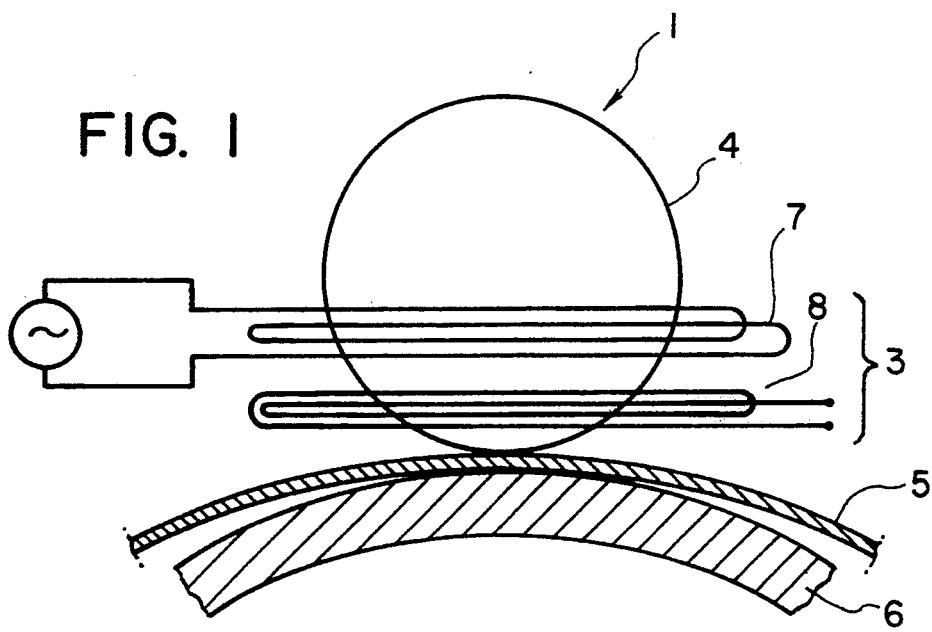
FIG. 1 shows a rolling probe for a measuring of the thickness of layers or strips according to the magneto-inductive process.
Figure 2:
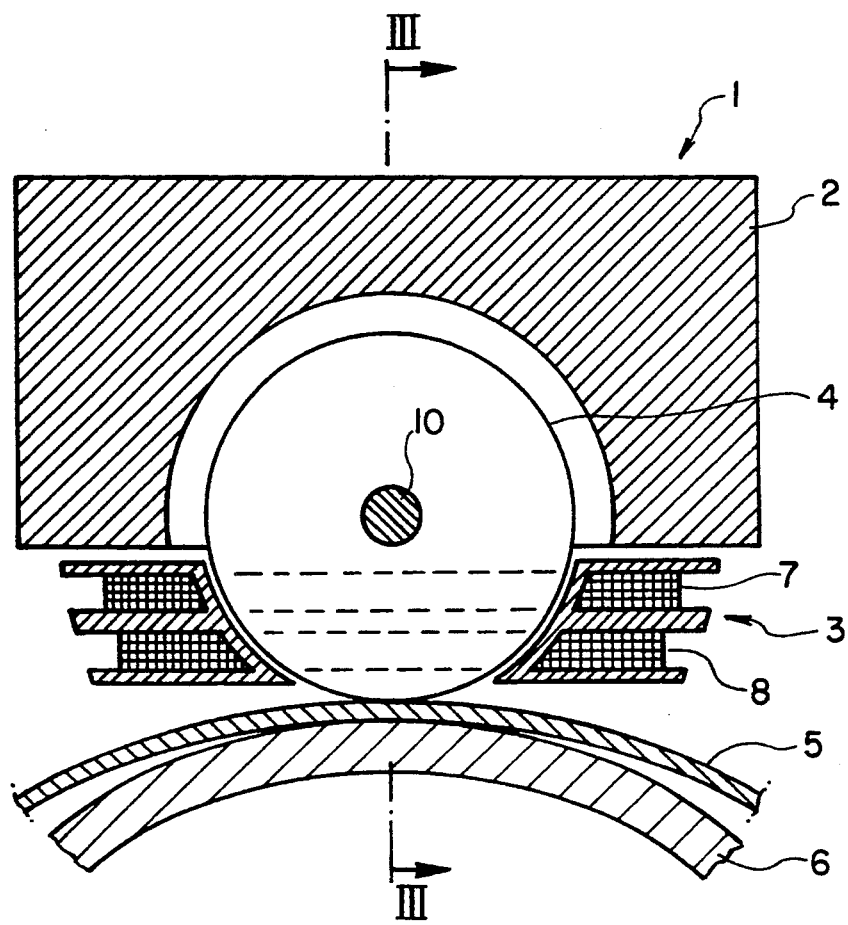
FIG. 2 shows a vertical section through such a rolling probe with a disk or cylinder rotatably mounted on a support, which, in its lower part, is surrounded without contact by a measuring coil arrangement.
Figure 3:
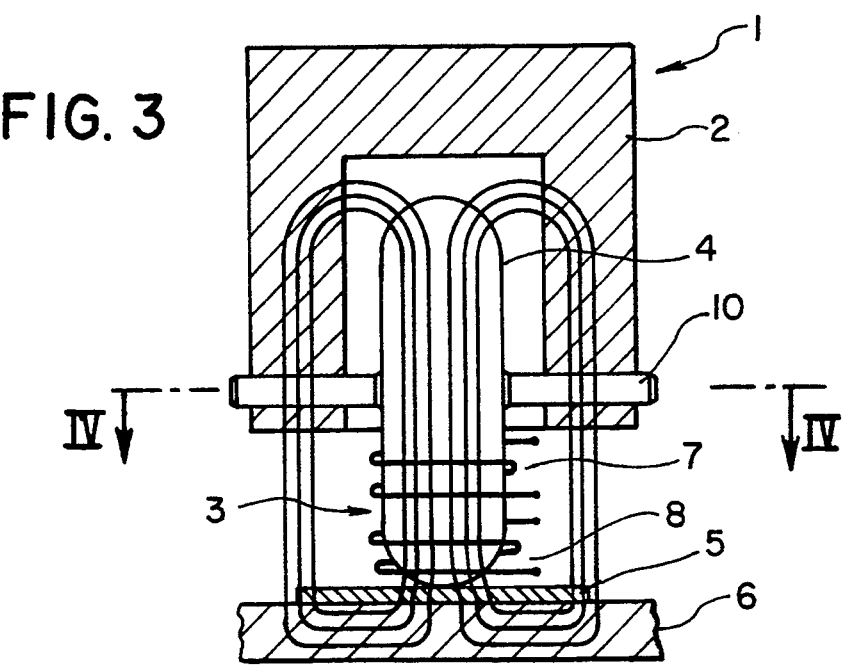
FIG. 3 shows a vertical section through this rolling probe according to line of intersection III—III of FIG. 2.
Figure 4:
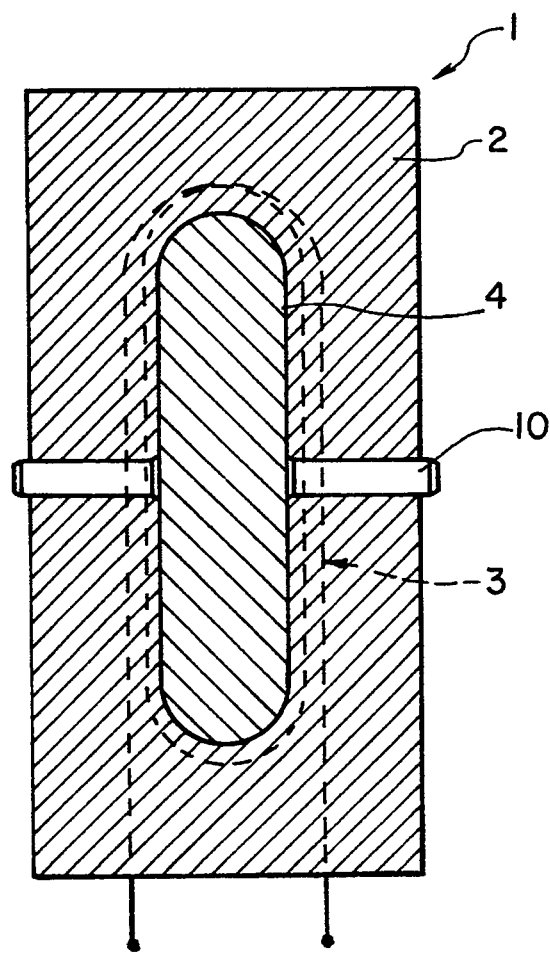
FIG. 4 shows a horizontal section through the rolling probe according to line of intersection IV—IV of FIG. 3.
Figure 5:
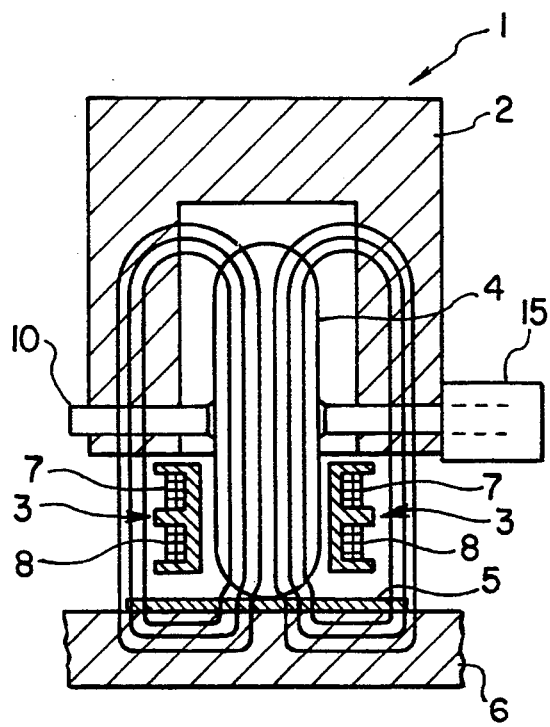
FIG. 5 shows a vertical section corresponding to FIG. 3 through such a rolling probe with a position sensor for hodometry or length measurement.
Figure 6:
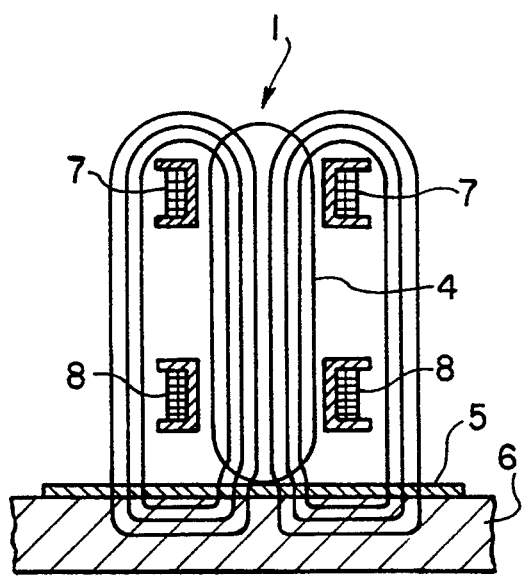
FIG. 6 shows an embodiment of such a rolling probe modified relative to FIG. 5.

List of Reference Numerals
1. Measuring probe
2. stationary part of nonmagnetic or magnetic material
3. measuring coil system
4. roller
5. object to be measured
6. support
7. excitation winding
8. measuring winding
9. excitation winding/measuring winding
9a. measuring winding
10. axis of rotation
11. permanent bar magnets
11a. magnetic field lines
12. magnetic field sensor
13. bearing shell
14. bearing shell
15. ring bearing
16. ring bearing
17. position sensor In all shown embodiments, measuring probe 1, represented only in its essential parts, consists of a stationary part 2, which consists of a magnetic or nonmagnetic material and has, e.g., a sensor system as well as a rotating, rotationally symmetrical roller 4 as a measuring pole, which directly contacts the surface of object 5 to be measured. Roller 4 can be designed either as a disk, cylinder or sphere.

For an operation of measuring probe 1 according to the magneto-inductive process of DIN 50 981 corresponding to FIGS. 1 to 6 of the drawing, rotating roller 4 is placed in the electromagnetic field of a measuring coil system 3. On the contact surface with object to be measured 5, roller 4 can be made spherical. The measuring signal (currents, voltages, frequency) of stationary measuring coil system 3 is a function of the distance of the contact points of roller 4 to the surface of a support 6 present under the layer to be measured in the form of a metal element, which is used as a reference surface.

A generally moving material present between roller 4 and the metal surface of the reference element, such as, plastic sheets, sheet metal strips and the like, is in this way determined in its thickness as object to be measured 5.

The electromagnetic measuring probe shown in FIGS. 1 to 6 can be operated according to different measuring methods. In so doing, roller 4 is designed as a rotationally symmetrical element in the form of a disk, cylinder or sphere and preferably consists of a highly permeable, ferromagnetic, soft magnetic or ferritic material. The roller is simultaneously a contact element and magnetically active measuring pole, and the materials of the layer to be measured and of support 6 being used as a reference element have to differ sufficiently magnetically to obtain a measuring signal that can be evaluated. These requirements are always given if object to be measured 5 is, e.g., a moving plastic sheet or a nonferrous metal sheet and the reference element being used as support 6 consists of a ferromagnetic steel. The measuring frequency is preferably lower than 10 kHz. Measuring coil system 3 in this case consists of an excitation winding 7 with low excitation frequency and a measuring winding 8 for picking up the measuring signal.

Figure 7:
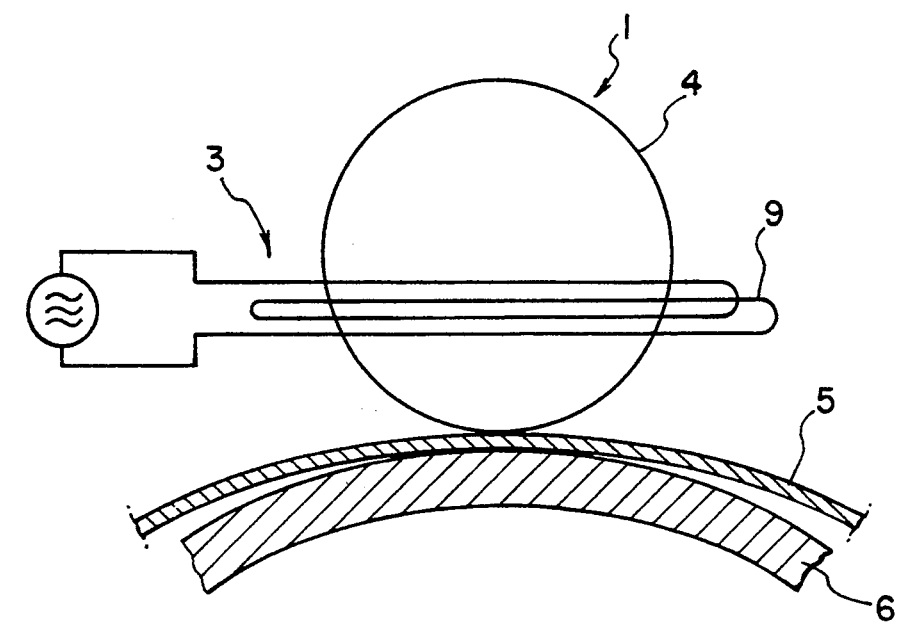
FIG. 7 shows a diagrammatic embodiment of a rolling probe with a coil-sensor system according to the eddy-current process.

But measuring probe 1 according to the invention can also be operated with the embodiment shown in FIG. 7 according to the eddy-current process of DIN 50 984.

This process can be used in different variants for different uses. The measuring frequencies are higher than in the magneto-inductive process and preferably greater than 10 kHz.

In the embodiment of FIG. 7, roller 4 of measuring probe 1 consists of a ferritic (soft magnetic) material. Object 5 to be measured is nonconducting, e.g., a plastic sheet. Support 6 being used as a reference piece consists of nonferrous metal, e.g., light metal. Roller 4 is simultaneously a contact element and ferritically active measuring pole. Measuring coil system 3 consists of an excitation winding 9 to produce the eddy-current field with higher excitation frequency, which is also used as a measuring winding.

Instead of the two embodiments of measuring probe 1 described above for an operation according to the magneto-inductive process or according to the eddy-current process, roller 4 of measuring probe 1 can also consist of either an insulating or ferritic material, while object 5 to be measured consists of nonferrous metal. In this case, support 6 has to differ sufficiently from object to be measured 5 with respect to its electrical conductivity so that a measuring signal that can be evaluated is obtained.

Figure 8:
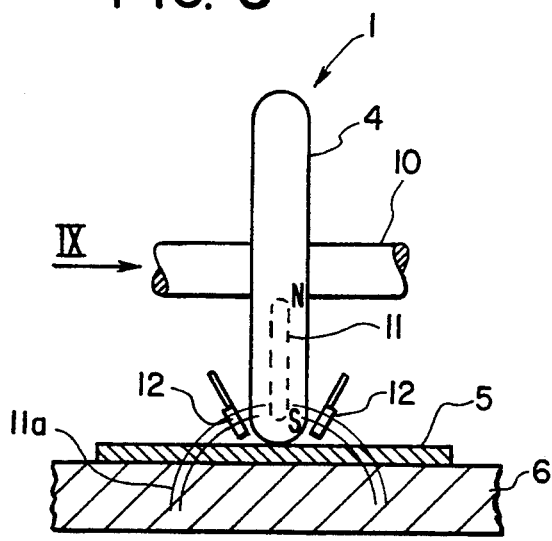
FIG. 8 shows another modified embodiment of such a rolling probe with permanent bar magnets placed on its roller and stationary magnetic field sensors directly beside the contact point of the rolling probe on the surface of a layer to be measured on a support.
Figure 9:
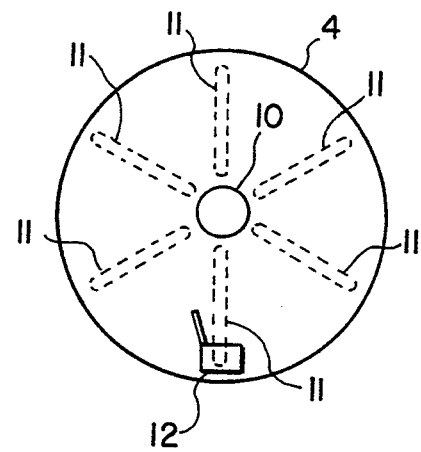
Figure 10:
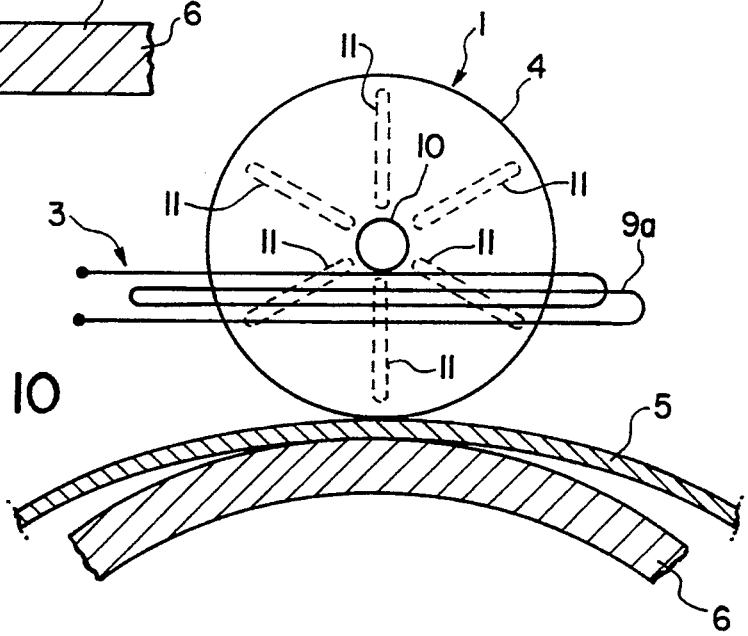
FIG. 10 shows another modified embodiment of such a rolling probe with permanent bar magnets and a permanently placed measuring coil.

Instead of the embodiments described above, measuring probe 1 according to the invention also can be designed as is shown in FIGS. 8 to 10.

Figure 8A:
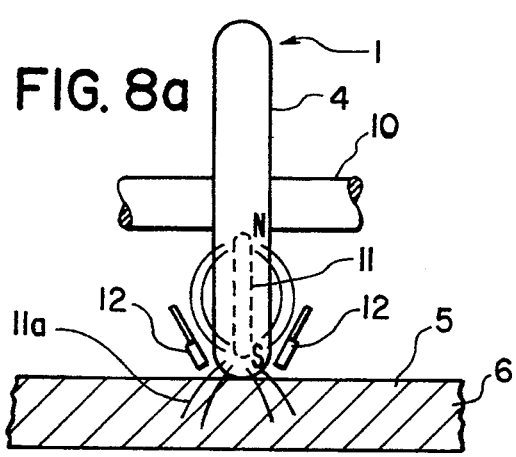
FIG. 8a shows the rolling probe with the magnetic field sensors in the absence of a layer.

In this case, several, for example, six, permanent bar magnets 11, uniformly distributed on the periphery, radially directed outward from axis of rotation 10 of roller 4, are provided in or on a rotationally symmetrical, nonmagnetic roller 4, bar magnets which in the rotation of roller 4 in the change of the reference plane approach support 6 consisting of a ferromagnetic material. The magnetic field of permanent bar magnets 11, changed as a result and also by the thickness of object to be measured 5 lying on support 6, is measured in the embodiment of FIG. 10 by measuring coil system 3 with a permanently placed measuring winding 9a and in the embodiment of FIGS. 8, 8a and 9 by at least one stationary magnetic field sensor 12 in direct proximity of the contact point of roller 4 on the surface of object to be measured 5, as is shown in FIG. 8, where magnetic field lines 11a of permanent bar magnets 11 run through magnetic field sensors 12 and the layer to be measured, while, in the absence of the layer to be measured (FIG. 8a)—drawn for the case that the layer thickness of object to be measured 5 goes toward zero—, passing magnetic field sensors 12 they enter support 6 directly and thus produce a corresponding measuring signal in each passage of a permanent bar magnet 11. Undulating signals are produced, in which the amplitude is a function of the layer thickness of object to be measured 5. These signals can be evaluated in a coil system either directly as voltage signals at constant rpm or as flow signals with a voltage integrator (RC link or flowmeter) at a nonconstant rpm or as magnetic field signals in using magnetic field-dependent sensors (Hall sensors or magneto-resistors). Magnetic field sensor 12 is placed in this case at a point next to permanent bar magnets 11 rotating with roller 4, on which in each passage of a permanent bar magnet 11, a noticeable change of the field strength and/or field direction of the stray field of the magnet is present.

To make the bearing surface of roller 4 wear-resistant, especially in a design made of soft material, the surface of roller 4 can be hard-coated in a known way.

Further, by magnetic or optoelectronic detection of markings, e.g., holes, rotating roller 4, when it is designed as a cylinder or disk, can also be used simultaneously for hodometry or length measurement.

Figure 11:
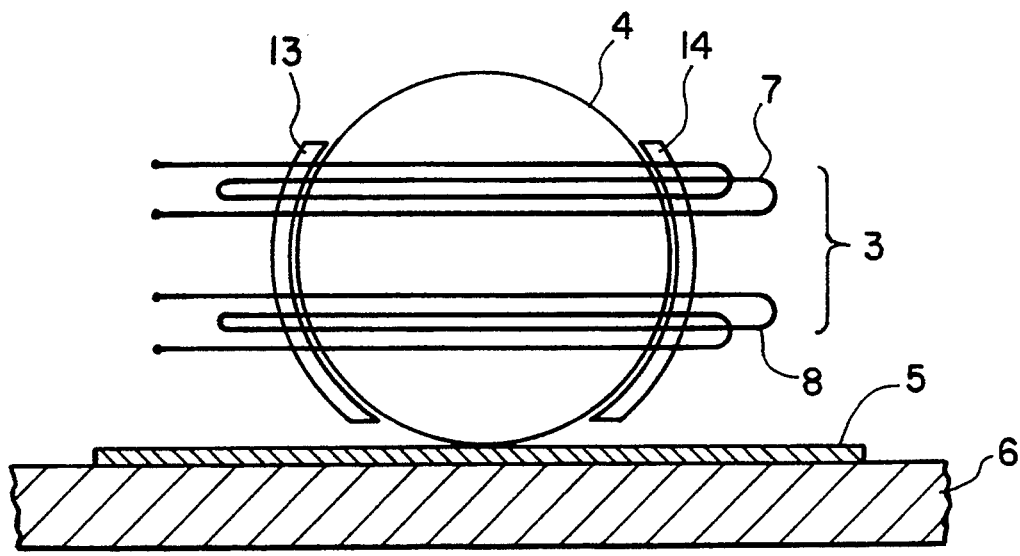
FIG. 11 shows a rolling probe with a sphere as a roller and with a coil arrangement for measuring according to the magneto-inductive process in a first embodiment.
Figure 12:
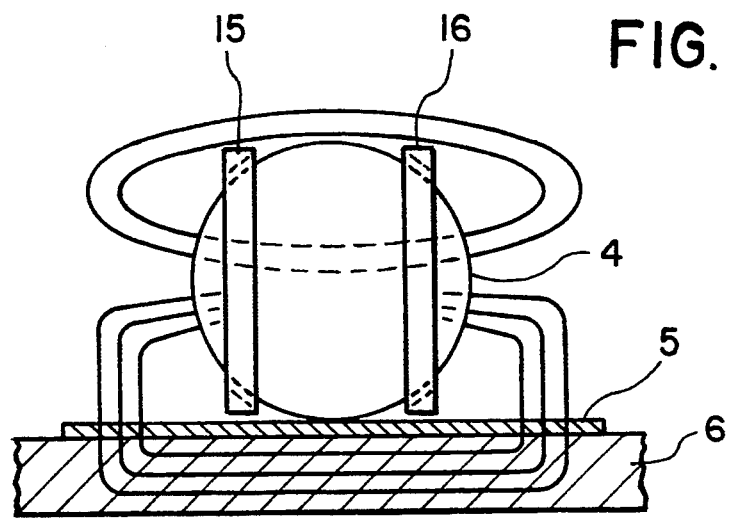
FIG. 12 shows another embodiment of such a rolling probe with a spherical roller.

In using a sphere as roller 4 according to the embodiments of FIGS. 11 and 12, the magneto-inductive process according to DIN 50 981 or the eddy-current process according to DIN 50 984 can also be used. In doing so, it is possible, by air-cushioning of roller 4 between concave bearing shells 13, 14 according to FIG. 11 or between lateral ring bearings 15, 16 according to FIG. 12, to produce a defined distance to the coil form of measuring coil system 3. Such a spherical roller 4 makes possible, in particular with the traversing operation, the unwinding of measuring probe 1 in all directions.

Another type of hodometry or length measurement can take place in that a position sensor 15 (FIG. 5) is placed on rotating axis 10 of roller 4. This is especially advantageous when the thickness of a moving object to be measured 5, such as a sheet, is to be measured also by traversing measuring probe 1 in crosswise direction.

An especially simple and advantageous hodometry or length measurement can further take place in that permanent bar magnets 11 are not uniformly distributed on the periphery of roller 4, so that the distance covered by the rolling probe results from the sequence of the measuring signals of the rotating roller.

What is claimed is:

1. An apparatus for the continuous measuring of the thickness of at least one layer or strip of electrically conducting or insulating or magnetic or non-magnetic material, said at least one layer or strip being on an elongated surface of a base during said continuous measuring, said at least one layer or strip having a material property which differs from said base, said apparatus comprising a rolling sensor system adapted to operate in conjunction with said base to effect said continuous measuring of the thickness of said at least one layer or strip, said rolling sensor system comprising, in combination:

(i) a rotating, rotationally symmetrical measuring pole composed of a ferro-magnetic material, the rotating, rotationally symmetrical measuring pole being adapted to contact said at least one layer or strip which is on said elongated surface of said base, there being an electromagnetic or magnetic effect in conjunction with said rotating ferromagnetic pole which varies according to the thickness of said at least one layer or strip on said elongated surface of said base, and (ii) a stationary, sensor system adapted to sense the electromagnetic or magnetic effect in the ferromagnetic material of said probe which changes according to the thickness of said at least one layer or strip on said elongated surface of said base.

2. The apparatus as claimed in claim 1 wherein the elongated surface of said base is substantially flat or is curved, and wherein said continuous thickness measurement is conducted with said rolling sensor system being in a static position and with said at least one layer or strip on said base being continuously moved relative to said rolling sensor system, or is conducted with said at least one layer or strip on said base being in a static position and with said rolling sensor system being continuously moved relative to said at least one layer or strip on said base.

3. The apparatus as claimed in claim 1 wherein said at least one layer or strip is electrically insulating or weakly conductive and said base is electrically highly conductive, or wherein said at least one layer or strip is electrically highly conductive and said base is electrically insulating or weakly conductive, or wherein said at least one layer or strip is ferromagnetic and said base is non-magnetic or weakly ferromagnetic, or wherein said at least one layer or strip is non-magnetic or weakly ferromagnetic and said base is ferromagnetic.

4. The apparatus according to claim 1 wherein said rotating, rotationally symmetrical measuring pole is a disk or a cylinder.

5. The apparatus according to claim 1 wherein the rotating, rotationally symmetrical measuring pole is a sphere.

6. The apparatus according to claim 1 wherein the rotating, rotationally symmetrical measuring pole has a bearing surface which is hard-coated.

7. The apparatus according to claim 1 further comprising a position sensor which is placed on the rotating axis of the rotating, rotationally symmetrical measuring pole.

8. The apparatus according to claim 1 further comprising an excitation winding where the stationary measuring coil system according to the magneto-inductive process with the excitation winding flown through by an alternating current with low excitation frequency and a measuring winding, positioned around the rotating, rotationally symmetrical measuring pole in proximity to the at least one layer or strip, is allocated to the rotating, rotationally symmetrical measuring pole, and a reference area each of suitable material on the opposite side of said at least one layer or strip is designated to the rotating, rotationally symmetrical measuring pole.

9. The apparatus according to claim 1 further comprising an excitation and measuring winding where the stationary measuring coil system according to the eddy-current process with the excitation and measuring winding flown through by an alternating current with high excitation frequency and, positioned around the rotating, rotationally symmetrical measuring pole in proximity of the at least one layer or strip, is allocated to the rotating, rotationally symmetrical measuring pole, and a reference area each of suitable material on the opposite side of said at least one layer or strip is designated to the rotating, rotationally symmetrical measuring pole.

10. An apparatus for the continuous measuring of the thickness of at least one layer or strip of electrically conducting or insulating or magnetic or non-magnetic material or at least one said layers or strips, comprising, in combination:
    (a) a base composed of a ferro-magmatic material which has an elongated bearing surface, said bearing surface contacting said at least one layer or strip during said continuous measuring, said at least one layer or strip having a material property which differs from said base (a); and
    (b) a rolling probe adapted to operate in conjunction with said base (a) to effect said continuous measuring of the thickness of said at least one layer or strip, comprising:
        (i) a measuring pole having a rotating, rotationally symmetrical disc body composed of a non-magnetic material, a series of elongated magnets being located in said disk on an equi-spaced basis and being oriented on radials of said disk body, the rotating, rotationally symmetrical disk body being adapted to contact said elongated bearing surface of said base or, when said at least one layer or strip is in contact with said elongated bearing surface, to contact said at least one layer or strip opposite of where said elongated bearing surface contacts said at least one layer or strip, and
        (ii) a stationary, sensor system adapted to sense the magnetic effect which changes according to the thickness of said at least one layer or strip on said elongated bearing surface.

11. An apparatus for the continuous measuring of the thickness of at least one layer or strip of electrically conducting or insulating or magnetic or non-magnetic material or at least one said layers or strips, comprising, in combination:
    (a) a rotating base which has a cylindrical or spherical bearing surface, said bearing surface contacting said at least one layer or strip during said continuous measuring, said at least one layer or strip having a material property which differs from said base (a); and
    (b) a rolling probe adapted to operate in conjunction with said base (a) to effect said continuous measuring of the thickness of said at least one layer or strip, comprising:
        (i) a measuring pole having a rotating, rotationally symmetrical body composed of the ferro-magnetic material, the rotating, rotationally symmetrical body being adapted to contact said bearing surface of said base or, when said at least one layer or strip is in contact with said bearing surface, to contact said at least one layer or strip opposite of where said bearing surface contacts said at least one layer or strip, and
        (ii) a stationary, sensor system adapted to sense the electromagnetic or magnetic effect which changes according to the thickness of said at least one layer or strip on said bearing surface of said rotating base (a).

12. The apparatus as claimed in claim 11 wherein said at least one layer or strip is electrically insulating or weakly conductive and said bearing surface is electrically highly conductive, or wherein said at least one layer or strip is electrically high conductive and said bearing surface is electrically insulating or weakly conductive, or wherein said at least one layer or strip is ferromagnetic and said bearing surface is non-magnetic or weakly ferromagnetic, or wherein said at least one layer or strip is non-magnetic or weakly ferromagnetic and said bearing surface is ferromagnetic.

13. An apparatus for the continuous measuring of the thickness of at least one layer or strip of electrically conducting or insulating or magnetic or non-magnetic material or at least one said layers or strips, comprising, in combination:
    (a) a stationary base which has a cylindrical or spherical bearing surface, said bearing surface contacting said at least one layer or strip during said continuous measuring, said at least one layer or strip having a material property which differs from base (a); and
    (b) a rolling probe adapted to operate in conjunction with said base (a) to effect said continuous measuring of the thickness of said at least one layer or strip, comprising:
        (i) a measuring pole having a rotating, rotationally symmetrical body composed of the ferro-magnetic material, the rotating, rotationally symmetrical body being adapted to contact said bearing surface of said base or, when said at least one layer or strip is in contact with said bearing surface, to contact said at least one layer or strip opposite of where said bearing surface contacts said at least one layer or strip, and
        (ii) a stationary, sensor system adapted to sense the electromagnetic or magnetic effect which changes according to the thickness of said at least one layer or strip on said bearing surface of said stationary base (a).

14. The apparatus as claimed in claim 13 wherein said at least one layer or strip is electrically insulating or weakly conductive and said bearing surface is electrically highly conductive, or wherein said at least one layer or strip is electrically high conductive and said bearing surface is electrically insulating or weakly conductive, or wherein said at least one layer or strip is ferromagnetic and said bearing surface is non-magnetic or weakly ferromagnetic, or wherein said at least one layer or strip is non-magnetic or weakly ferromagnetic and said bearing surface is ferromagnetic.

* * * * *